United States Patent
Unger et al.

(10) Patent No.: US 7,282,813 B2
(45) Date of Patent: Oct. 16, 2007

(54) AC POWER BACKFEED PROTECTION BASED ON PHASE SHIFT

(75) Inventors: Thomas Michael Unger, Burnaby (CA); Mare Badenhorst, Port Coquitlam (CA); James Alexander Eichner, Vancouver (CA); Masautso Wilson Ngosi, Port Conquitlam (CA)

(73) Assignee: Xantrex International, St. Michael (BB)

( * ) Notice: Subject to any disclaimer, the term of this patent is extended or adjusted under 35 U.S.C. 154(b) by 488 days.

(21) Appl. No.: 11/008,264

(22) Filed: Dec. 10, 2004

(65) Prior Publication Data

US 2006/0126241 A1 Jun. 15, 2006

(51) Int. Cl.
*H02H 7/00* (2006.01)
(52) U.S. Cl. ........................................ 307/66
(58) Field of Classification Search .................. 307/66
See application file for complete search history.

(56) References Cited

U.S. PATENT DOCUMENTS 5,579,197 A * 11/1996 Mengelt et al. ............ 361/93.4

* cited by examiner

*Primary Examiner*—Robert L. Deberadinis

(57) ABSTRACT

A system having input terminals including line and neutral terminals for receiving AC power from a first AC source and having output terminals including output line and neutral terminals for receiving AC power from output terminals of a second AC source and for supplying AC power to a load, has a transfer switch configurable to connect the input terminals to the output terminals or to isolate the input terminals from the output terminals. When the transfer switch is configured to isolate the output terminals from the input terminals, the second AC source is caused to cease supplying power to the output terminals when after phase shifting the voltage produced by the second source the voltage at the input terminals is in-phase with that voltage.

39 Claims, 12 Drawing Sheets

AC POWER BACKFEED PROTECTION BASED ON PHASE SHIFT

BACKGROUND OF THE INVENTION

1. Field of Invention

This invention relates to the prevention of backfeed of power into an alternating current (AC) power source when supplying a load from alternate sources of AC power.

2. Description of Related Art

Various systems exist for selectively supplying AC power to a load from first or second AC sources. Typically such systems may have input terminals comprising line and neutral terminals for receiving AC power from the first AC source and output terminals comprising output line and neutral terminals for receiving AC power from the second source and for supplying AC power to the load. The first AC source is often an AC mains supply provided by an electric utility company and the second AC source often involves an inverter or inverter/charger device.

Typically a transfer switch is connected between the input terminals and the output terminals and is operable to selectively connect the input terminals to the output terminals or to isolate the input terminals from the output terminals. Such a transfer switch may be provided by a relay, for example, having a coil energized by the first AC source and configured such that while AC power is available from the first AC source the load receives power from the first AC source. Where the second AC source is an inverter/charger device, circuitry in the device detects that AC power is being supplied by the first source and shuts down the device or causes it to assume a charge mode in which batteries connected to the device are charged using current drawn from the first AC source.

In the event that a voltage or current anomaly occurs at the input terminals, perhaps due to a fault in the electric utility, the relay acting as the transfer switch may momentarily drop out while current is being supplied to the load, which can cause the relay contacts to become welded together. Alternatively, a fault may occur within the relay itself or in the system as a whole that causes the relay to stay in a connection mode, in which the input terminals are connected to the output terminals, even though the relay may be unenergized.

When a transfer switch relay undesirably remains in the above mentioned connection mode and the inverter/charger device attempts to supply power to the load, backfeed of power into the first AC source can occur. This can be hazardous. In many areas, electrical codes require that should backfeed occur, the source of the backfeed must be shut off within a certain period of time, such as 2 seconds, to avoid perturbing the electric utility system.

Prior methods for sensing backfeed have involved employing a contact in a single pole double throw arrangement whereby a first contact of this arrangement is connected to the line terminal of the first AC source, a second contact is connected to sensing circuitry and a common contact is connected to the output line terminal. When the relay is energized the common contact is connected to the first contact and when the relay is unenergized, the common contact is connected to the second contact. This scheme Is used with the assumption that if the first contact is welded to the common contact, and it is known that the relay is not energized, the second contact will not be connected to the common terminal. This condition is sensed and, in response, a signal is produced to cause the second AC source to shutdown. This solution has limited flexibility as a special relay contact arrangement must be used. This scheme is also solely directed to detecting whether or not the transfer switch relay has malfunctioned and is incapable of detecting other anomalous conditions such as a floating ground condition, where the neutral output terminal is at a different potential than a ground terminal.

SUMMARY OF THE INVENTION

In a system for selectively supplying AC power to a load from first or second AC sources, the system may have input terminals including line and neutral terminals for receiving AC power from the first AC source and having output terminals including output line and neutral terminals for receiving AC power from the second source and for supplying AC power to the load. The input terminals and the output terminals may be selectively connectable by a transfer switch configurable to connect the input terminals to the output terminals or to isolate the input terminals from the output terminals.

In accordance one aspect of the invention, there is provided a process for detecting an unsafe condition. The process involves receiving a first voltage signal representing a first voltage on the input line terminal relative to the output neutral terminal, receiving a second voltage signal representing an output voltage produced by the second AC source and supplied to the output terminals of the system, and receiving an input current signal representing input current in the input line terminal. When the transfer switch is configured to isolate the output terminals from the input terminals, the process involves causing the second AC source to phase shift the second voltage when the first voltage and input current meet a set of criteria and the first and second voltages are in-phase, and after phase shifting the second voltage, causing the second AC source to cease supplying power to the output terminals when the first and second voltages are still in phase.

Causing the second AC power source to phase shift the second voltage may involve producing a phase shift signal for receipt by the second AC source for causing the second AC source to phase shift the second voltage. Causing the second AC power source to cease supplying power to the output terminals may involve producing a shutdown signal for receipt by the second AC source. The process may further involve causing the second AC source to cease supplying power to the output terminals, when, after phase shifting the second voltage, the first and second voltages are not in phase and the input current exceeds a reference current.

Causing the second AC source to cease supplying power to the output terminals may involve producing a shutdown signal for receipt by the second AC source.

The process may further involve determining whether the first and second voltages are in-phase and this may involve detecting a time difference between a zero-voltage crossing of the first voltage and a zero-voltage crossing of the second voltage. Determining whether the first and second voltages are in-phase may involve producing a signal when the time difference is less than a reference value.

The process may further involve determining whether the transfer switch is configured to isolate the output terminals from the input terminals.

The process may further involve causing the second AC source to cease supplying power to the output terminals when the first voltage and the input current satisfy a set of criteria. Causing the second AC source to cease supplying power to the output terminals may involve producing a shutdown signal for receipt by the second AC source.

The first set of criteria may include the first voltage has an amplitude that exceeds a first reference voltage, and the input current has a value that exceeds a reference current.

The process may further involve receiving a third voltage signal representing a third voltage between the input line terminal and the input neutral terminal, and causing the second AC power source to cease supplying power to the output terminals when the third voltage exceeds a reference voltage and the input current exceeds a reference current.

Causing the second AC source to cease supplying power to the output terminals may involve producing a shutdown signal for receipt by the second AC source.

In accordance with another aspect of the invention, there is provided a computer readable medium encoded with codes for directing a processor circuit to carry out the method or its variations above.

In accordance with another aspect of the invention, there is provided a computer readable signal encoded with codes for directing a processor to carry out the method or its variations above.

In accordance with another aspect of the invention there is provided an apparatus for detecting an unsafe condition in a system for selectively supplying AC power to a load from first or second AC sources. The system may have input terminals including line and neutral terminals for receiving AC power from the first AC source and may have output terminals including output line and neutral terminals for receiving AC power from output terminals of the second source and for supplying AC power to the load. The system may further include a transfer switch operable to selectively connect the input terminals to the output terminals or to isolate the input terminals from the output terminals. The apparatus includes provisions for receiving a first voltage signal representing a first voltage on the input line terminal relative to the output neutral terminal, provisions for receiving a second voltage signal representing second voltage produced by the second AC source, and provisions for receiving a current signal representing an input current in the input line terminal. The apparatus also includes provisions for producing a phase shift signal for receipt by the second AC source for causing the second AC source to phase shift the second voltage when the first voltage and input current meet a set of criteria and the first and second voltages are in-phase and when the transfer switch is configured to isolate the output terminals from the input terminals. The apparatus also has provisions for producing a shutdown signal when the first and second voltages are still in phase, after producing the phase shift signal.

The apparatus may further include provisions for determining whether the first and second voltages are in-phase. The apparatus may further include provisions for detecting a time difference between a zero-voltage crossing of the first voltage and a zero-voltage crossing of the second voltage. The apparatus may further include provisions for producing a signal when the time difference is less than a reference value. The apparatus may further include provisions for producing the shutdown signal when, after producing the phase shift signal, the first and second voltages are not in phase and the input current exceeds a reference current.

The apparatus may further include provisions for producing the shutdown signal for causing the second AC power source to cease supplying power to the output terminals when the first voltage signal and the input current signal indicate the first voltage and the input current satisfy a set of criteria. The apparatus may further include provisions for producing a transfer switch signal indicating the transfer switch is configured to isolate the output terminals from the input terminals. The apparatus may further include provisions for receiving a transfer switch signal when the transfer switch is configured to isolate the output terminals from the input terminals. The first set of criteria may include the first voltage signal indicates the first voltage has an amplitude that exceeds a reference voltage, and the input current signal indicates the input current has a value that exceeds a reference current.

The apparatus may further include provisions for receiving a third voltage signal representing a third voltage between the input line terminal and the input neutral terminal, and provisions for producing the shutdown signal when the third voltage signal indicates the third voltage exceeds a reference voltage.

In accordance with another aspect of the invention there is provided an apparatus for detecting an unsafe condition in a system for selectively supplying AC power to a load from first or second AC sources. The system may have input terminals including line and neutral terminals for receiving AC power from the first AC source and may have output terminals including output line and neutral terminals for receiving AC power from output terminals of the second source and for supplying AC power to the load. The transfer switch may be operable to selectively connect the input terminals to the output terminals or to isolate the input terminals from the output terminals. The apparatus includes a processor and a first voltage input coupled to the processor for receiving a first voltage signal representing a first voltage on the input line terminal relative to the output neutral terminal. The apparatus further includes a second voltage input coupled to the processor for receiving a second voltage signal representing a second voltage produced by the second AC source supplying power. The apparatus further includes a current input coupled to the processor circuit for receiving a current signal representing an input current in the input line terminal. The apparatus further includes a shutdown signal output coupled to the processor for producing a shutdown signal for causing the second AC source to cease supplying power to the output terminals when the transfer switch is configured to isolate the output terminals from the input terminals, and a phase shift signal output coupled to the processor for producing a phase shift signal for receipt by the second AC source for causing the second AC source to phase shift the second voltage. The processor is configured to cause the phase shift signal to be produced at the phase shift signal output when the first voltage and input current meet a set of criteria and the first and second voltages are in-phase, and is configured to cause a shutdown signal to be -produced when the first and second voltages are still in phase after producing the phase shift signal.

The apparatus may further include a detector operably configured to detect whether the first and second voltages are in-phase.

The detector may include a zero-crossing detector operably configured to detect a time difference between a zero-voltage crossing of the first voltage and a zero-voltage crossing of the second voltage. The detector may include a phase monitor signal generator operably configured to generate the phase monitor signal when the time difference is less than a reference value.

The apparatus may further include a phase monitor signal input coupled to the processor for receiving the phase monitor signal.

The apparatus may further include provisions for determining whether the first and second input voltages are in-phase. The apparatus may further include provisions for detecting a time difference between a zero-voltage crossing of the first voltage and a zero-voltage crossing of the second voltage. The apparatus may further include provisions for producing a signal when the time difference is less than a reference value.

The processor may be configured to cause the shutdown signal to be produced when, after producing the phase shift signal, the first and second voltages are not in phase and the input current exceeds a reference current. The processor may be configured to cause the shutdown signal output to produce the shutdown signal when the first voltage signal and the input current signal indicate the voltage and the input current satisfy a first set of criteria. The apparatus may further include a transfer switch signal input coupled to the processor for receiving a transfer switch signal when the transfer switch is configured to isolate the output terminals from the input terminals.

The processor may be configured to determine the first set of amplitude criteria are met when the first voltage signal indicates the first voltage has an amplitude that exceeds a reference voltage, and the input current signal indicates the input current has a value that exceeds the reference current.

The apparatus may further include a third voltage input coupled to the processor for receiving a third voltage signal representing a third voltage between the input line terminal and the input neutral terminal, the processor may be configured to produce the shutdown signal when the third voltage signal indicates the third voltage exceeds a third reference voltage and the input current exceeds a reference current.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
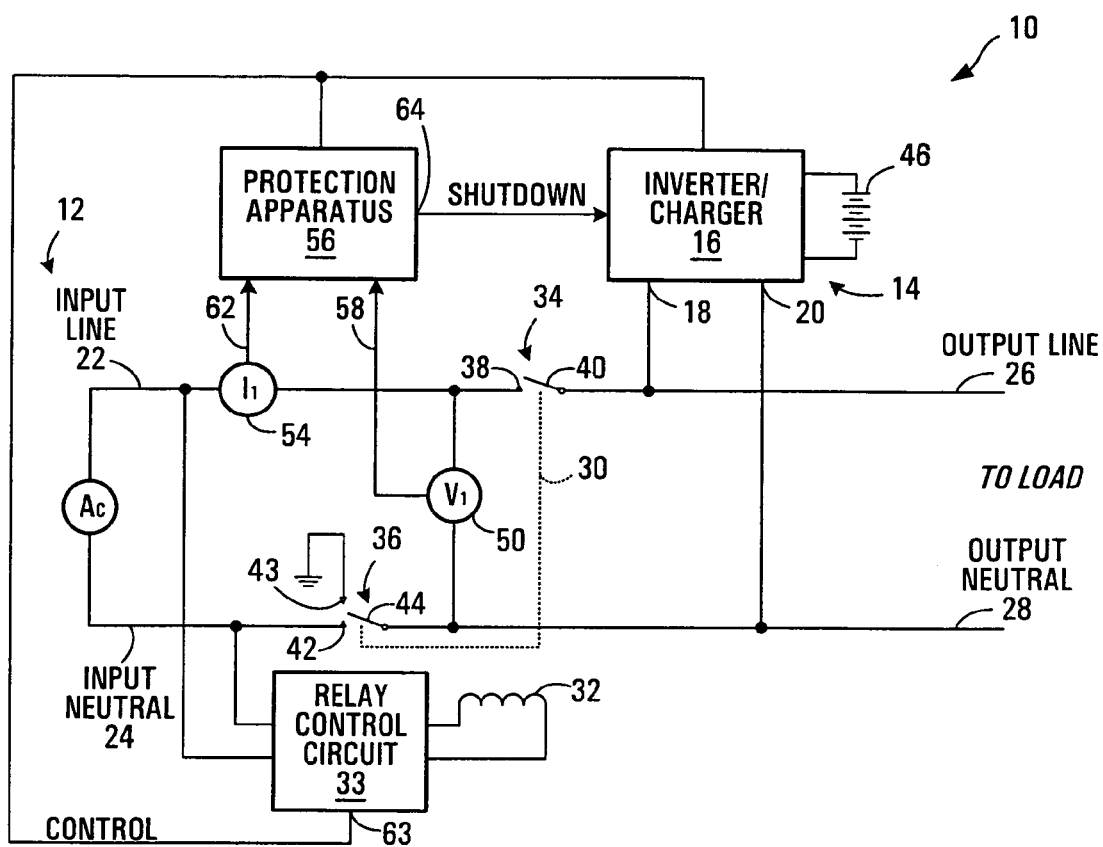
FIG. 1 is a schematic diagram of a system employing AC power backfeed protection according to a first embodiment of the invention.

Referring to FIG. 1, a system for selectively supplying AC power to a load from first or second AC sources is shown generally at 10. The first AC source is shown generally at 12 and a second AC source is shown generally at 14. The first AC source 12 may include an AC mains supply such as provided by an electric utility company, for example. Access to the AC mains supply may be provided through a circuit breaker panel or by direct connection into an AC outlet, for example. Other types of AC sources such as generators or inverters may alternatively be employed as the first AC source 12.

In this embodiment, the second AC source 14 includes an inverter/charger device 16 having line and ungrounded neutral output terminals 18 and 20, respectively. Alternatively, the second AC source could be an inverter, a generator, or other AC source.

The system 10 includes an input line terminal 22 and an input neutral terminal 24. These may be connected to line and neutral terminals of the AC outlet or circuit breaker associated with the first AC source, for example. The system 10 further includes an output line terminal 26 and an output neutral terminal 28 operable to be connected to a load to supply AC power to the load.

In this embodiment the system 10 includes a transfer switch comprising a relay shown generally at 30 having a coil 32 connected for energization from any suitable source such as the input line 22 and input neutral 24, for example, through a relay control circuit 33 and having line and neutral circuit interrupters 34 and 36, respectively. The line interrupter 34 includes a first contact 38 connected to the input line terminal 22 and includes a second contact 40 connected to the output line terminal 26. Similarly, the neutral interrupter 36 includes a first contact 42 connected to the neutral input terminal 24 and includes a output neutral contact 44 connected to the output neutral terminal 28. The neutral circuit interrupter 36 may further include a ground contact 43 connected to safety ground (earth ground). In effect, when the relay coil 32 is energized, the contacts 38 and 40 are closed and the contacts 42 and 44 are closed thereby connecting the input line terminal 22 to the output line terminal 26 and connecting the input line neutral 24 to the output neutral terminal 28. When the relay is energized, the load is supplied with power from the first AC power source 12. When the relay coil 32 is not energized, the output neutral terminal 28 is connected to the ground contact 43 in accordance with electrical code requirements.

The output line and neutral terminals 18 and 20 of the inverter/charger 16 are connected directly to the output line terminal 26 and output neutral terminal 28 of the system 10. The relay control circuit 33 includes circuitry (not shown) for detecting voltage on the input line terminal 22 relative to the input neutral terminal 24 and for energizing the relay when the input voltage meets amplitude and frequency requirements. This circuit 33 also has an output 63 that produces a control signal for receipt by the inverter/charger 16 to place the inverter/charger in an invert mode or a charge mode. The control signal has two states including a first state indicating the relay is unenergized and the contacts 38 and 40 and 42, 44 should be isolated, and the output neutral terminal 28 should be connected to ground, and a second state indicating the relay is energized and the contacts 38, 40 and 42, 44 should be connected. When the control signal is in the first state the inverter/charger is placed in the invert mode and when the control signal is in the second state the inverter/charger is placed in the charge mode.

When there is an interruption in the power supplied by the first AC power source 12, the relay control circuit 33 causes the relay coil 32 to de-energize, causing the contacts 38 and 40 to open and contacts 42 and 44 to open, thereby isolating the input line terminal 22 from the output line terminal 26 and isolating the input neutral terminal 24 from the output neutral terminal 28. Loss of power at the input line and neutral terminals 22 and 24 causes the relay control circuit to place the control signal in the first state. The inverter/charger 16 detects the control signal being in the first state and automatically switches into an inverter mode whereby current is drawn from a battery 46 and converted into AC power which is supplied via the output line and neutral terminals 18 and 20 to the output line and output neutral terminals 26 and 28 of the system 10 to supply power to the load.

In accordance with one aspect of the invention, the system 10 further includes a first voltage sensor 50 connected between the input line terminal 22 and the output neutral terminal 28 to detect a first voltage on the input line terminal 22 relative to the output neutral terminal 28. The placement of the first voltage sensor 50 between the input line terminal 22 and the output neutral terminal 28 enables the detection of the backfeed condition source such as a disconnected neutral or ground or a neutral that is not bonded to ground. The system 10 further includes a current sensor 54 for sensing current in the input line 22 and includes a protection apparatus 56 connected to the first voltage sensor 50 and current sensor 54 by signal lines 58 and 62, respectively, and connected to the relay control circuit 33 by signal line 63 to receive the control signal.

The first voltage sensor 50 produces a first voltage signal representing the first voltage and this first voltage signal is provided to the protection apparatus 56 by the signal line 58. The current sensor 54 produces a current signal representing input current in the input line 22 and this current signal is provided to the protection apparatus 56 by the signal line 62. In general, when the control signal is in the first state, and when the first voltage and the input current 54, as represented by the first voltage signal, and the current signal meet a first set of criteria, the protection apparatus 56 determines whether or not a shutdown signal should be produced at an output 64 thereof for receipt by the inverter/charger 16, to cause the inverter/charger to shutdown and cease supplying power to its output line terminal 18 and output neutral terminal 20. The shutdown signal may be a digital signal,- for-example, having two states, one indicating shutdown and the other indicating non-shutdown and the protection apparatus 56 may be configured to cause the shutdown signal to be in the non-shutdown state unless the first voltage and input current meet specified criteria.

The operation of the protection apparatus will now be described.

Figure 2:
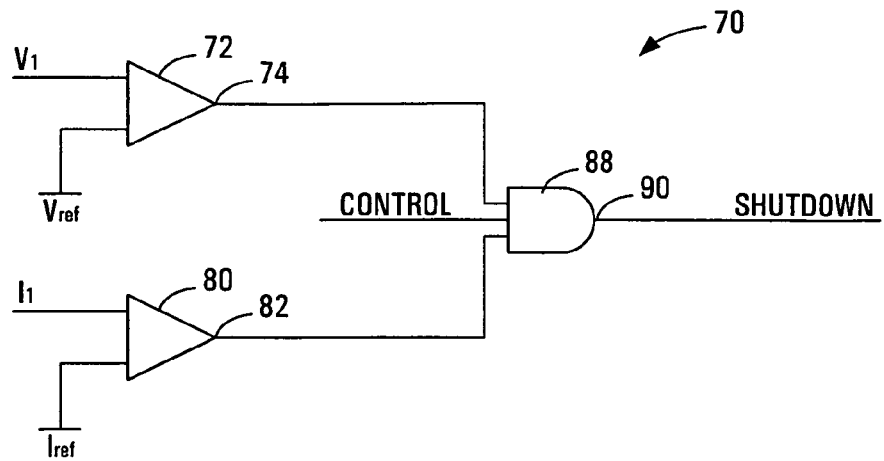
FIG. 2 is a logic diagram of a protection apparatus shown in FIG. 1.

Referring to FIG. 2, the function of the protection apparatus is shown generally at 70. In general, the first voltage signal is subjected to a comparator function, shown generally at 72, to compare the amplitude of the first voltage signal with a reference voltage and to set an output 74 active when the first voltage exceeds the reference voltage.

Similarly, the current signal is subjected to a comparison function 80 which causes an output 82 to produce a signal when the input current is above a reference current. The comparison signals produced by the outputs 74 and 82 are subjected to an AND function 88 such that when the first voltage exceeds the reference voltage and the input current exceeds the reference current, and the control signal is in the first state, an output 90 of the AND function 88 produces the shutdown signal to indicate the second AC source should be shutdown. The shutdown signal is received at an input of the inverter/charger which is responsive to the shutdown signal such that the shutdown signal causes the inverter/charger, and more generally the second AC power source to cease supplying power to its output terminals 18 and 20 when the first voltage and the input current satisfy a first set of criteria established by the comparison functions 72 and 80 and the AND function 88. In general, the first set of criteria are that the first voltage has an amplitude that exceeds a first threshold voltage and the input current has a value that exceeds a first threshold current.

Figure 3:
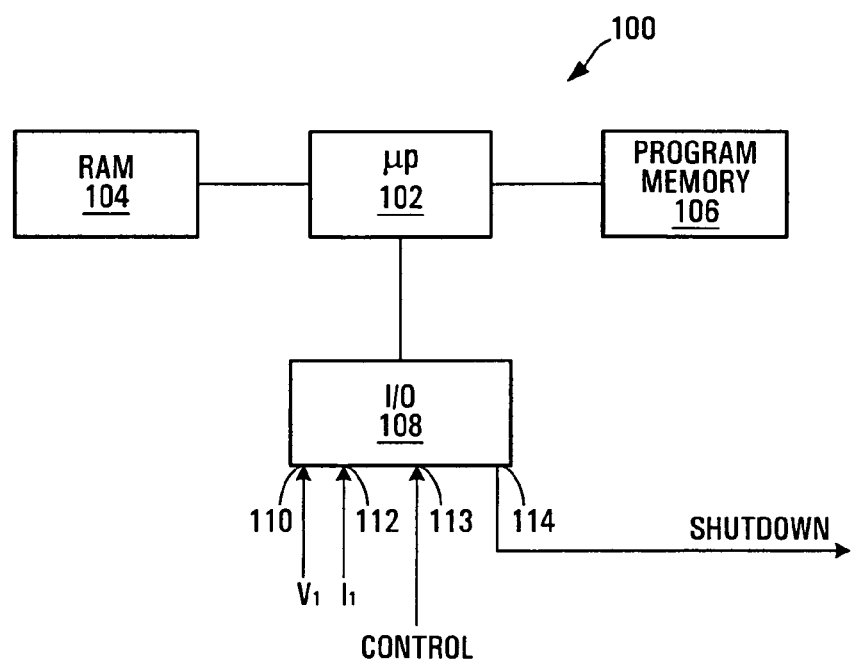
FIG. 3 is a block diagram of a microprocessor circuit for implementing the protection apparatus shown in FIG. 1.

Referring to FIG. 3, in an alternative embodiment, the protection apparatus 56 may be implemented by a processor circuit shown generally at 100. The processor circuit 100 includes a microprocessor 102, random access memory (RAM) 104, program memory 106 and an input(output (I/O) interface 108, all in communication with the microprocessor 102. The RAM 104 and program memory 106 may, of course, be integrated within the microprocessor circuit 102 itself. In addition, the I/O interface 108 may also be integrated within the microprocessor circuit 102.

The I/O interface 108 includes first, second and third inputs 110, 112 and 113 for receiving the first voltage signal, the input current signal and the control signal and further includes an output 114 for producing the shutdown signal.

Figure 4:
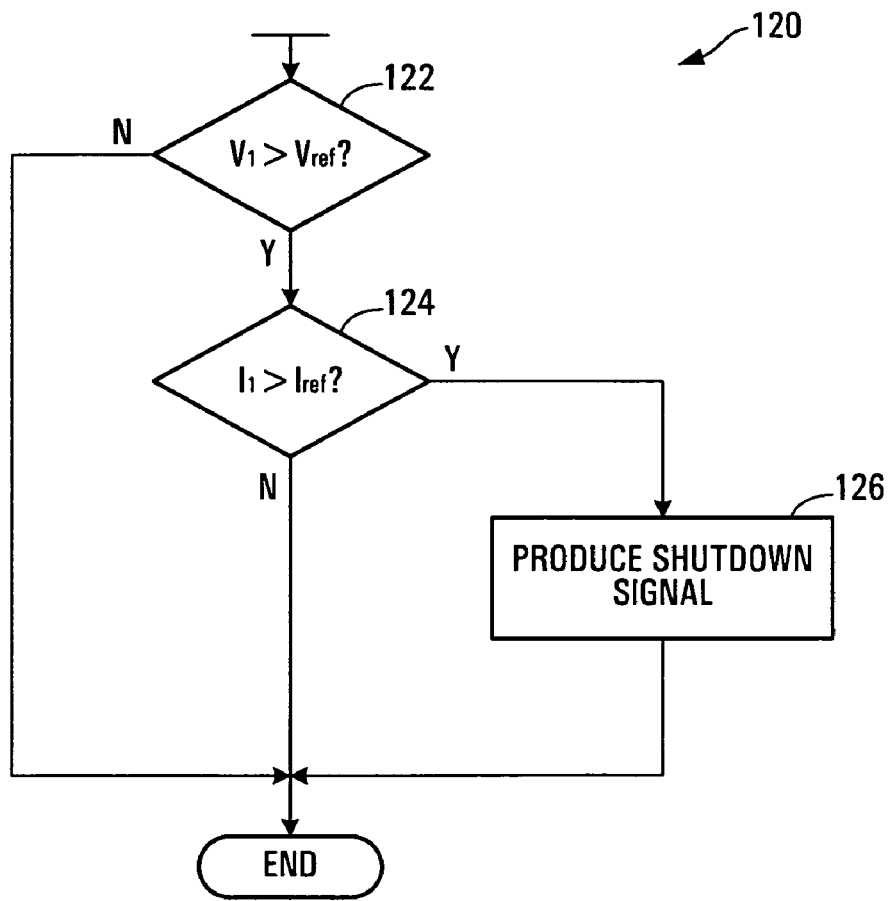
FIG. 4 is a flowchart of codes executed by the microprocessor circuit of FIG. 3 for implementing the protection apparatus shown in FIG. 1.

Referring to FIGS. 3 and 4, the program memory 106 is encoded with codes that are only executed when the control signal is in the first state and that direct the processor circuit 102 to determine an amplitude of the first voltage on the input line (22) relative to the output neutral terminal (20), to determine an amplitude of the input current in the input line terminal (22) and to produce the shutdown signal for causing the second AC power source to cease supplying power to the output terminals (26 and 28) when the first voltage and the input current satisfy the first set of criteria described above.

Representations of the blocks of codes for directing the processor 102 to execute this method are shown generally at 120 in FIG. 4. The blocks of codes shown in FIG. 4 thus direct the processor circuit to execute an algorithm for conducting the method described above. The codes are executed periodically while the control signal is in the first state, indicating the transfer switch is configured to isolate the output terminals from the input terminals. The codes include a first block 122 that directs the processor (102) to communicate with the I/O interface (108) to obtain an amplitude measurement of the first input voltage signal received at the first input (110). The I/O interface (108) may therefore include an RMS circuit and an A/D converter (not shown), for example, that produces a number, for example, representing an amplitude value of the RMS value of the first voltage that-can be read by the microprocessor (102). Other types of amplitude signals may alternatively be produced such as positive peak amplitude or peak negative amplitude, for example. The amplitude value represented to the microprocessor (102) by the I/O interface (108) is compared against a reference voltage value which may be stored in the program memory (106), for example, and if the indicated amplitude of the voltage signal is not greater than the reference voltage, the algorithm is ended.

If the first voltage is greater than the reference voltage, the processor (102) is directed to a second block of codes 124 which directs it to communicate with the I/O interface (108) to obtain an amplitude value representing the amplitude of the input current as indicated by the input current signal received at the second input (112). The I/O interface may also include an RMS circuit and A/D converter (not shown) for producing a number representing the RMS current in the input terminal (22) and this number is received by the processor (102) and compared to a reference current value to determine whether the input current is greater than the reference current value. If the input current is not greater than the reference current value, the algorithm is ended. If the input current is greater than the reference current value, the processor (102) is directed to block 126 which causes it to communicate with the I/O interface (108) to produce the shutdown signal at the output (114) to cause the inverter/charger (16) to be shutdown.

Figure 5:
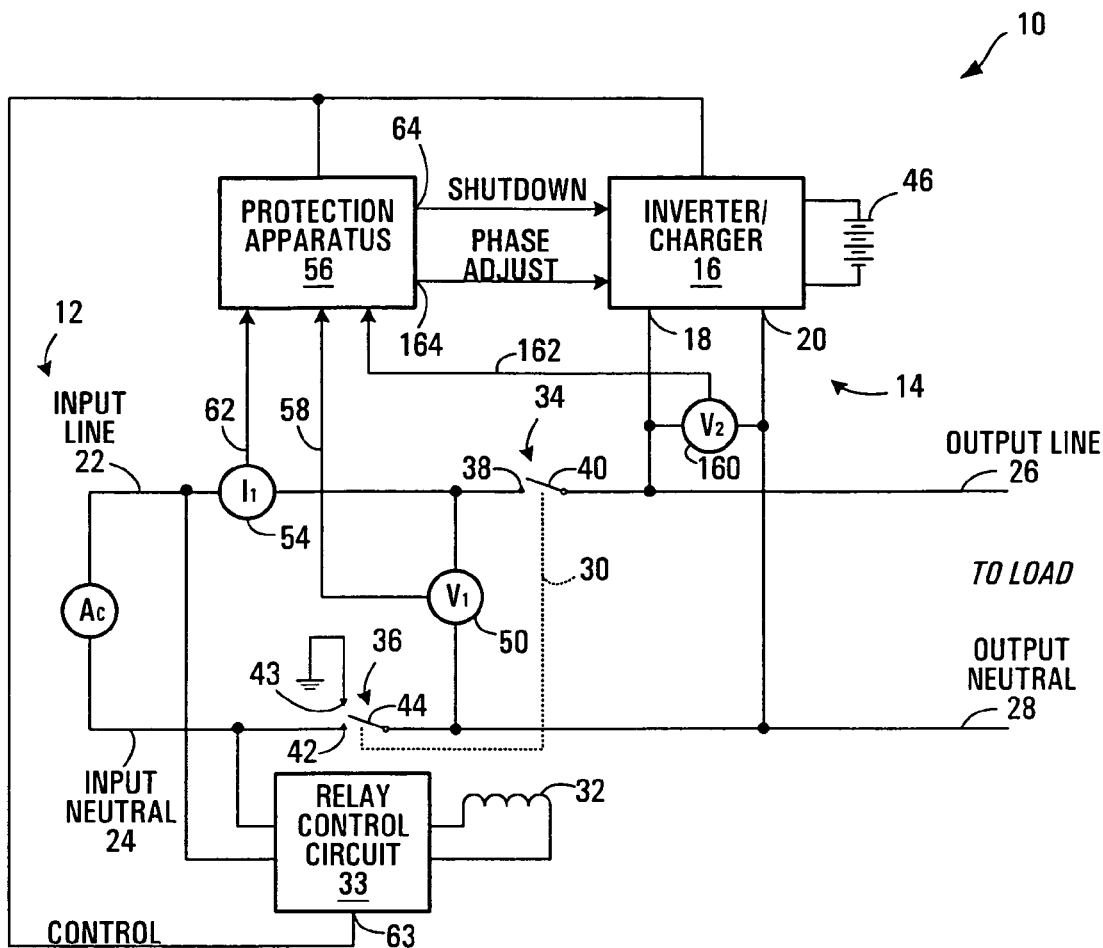
FIG. 5 is a schematic diagram of a system employing a protection apparatus according to a second embodiment of the invention.

Referring to FIG. 5, in an alternative embodiment, the system shown in FIG. 1 is provided with a second voltage sensor 160 for producing a second voltage signal representing a second voltage on the inverter/charger output line terminal 18 relative to the inverter/charger neutral terminal 20. The second voltage signal is communicated to the protection apparatus 56 by a signal line 162. In addition, the protection apparatus has an output 164 for producing a phase adjust signal for receipt by the inverter/charger 16 for causing the inverter/charger to phase shift the voltage it produces across its output terminals 18 and 20.

Figure 6:
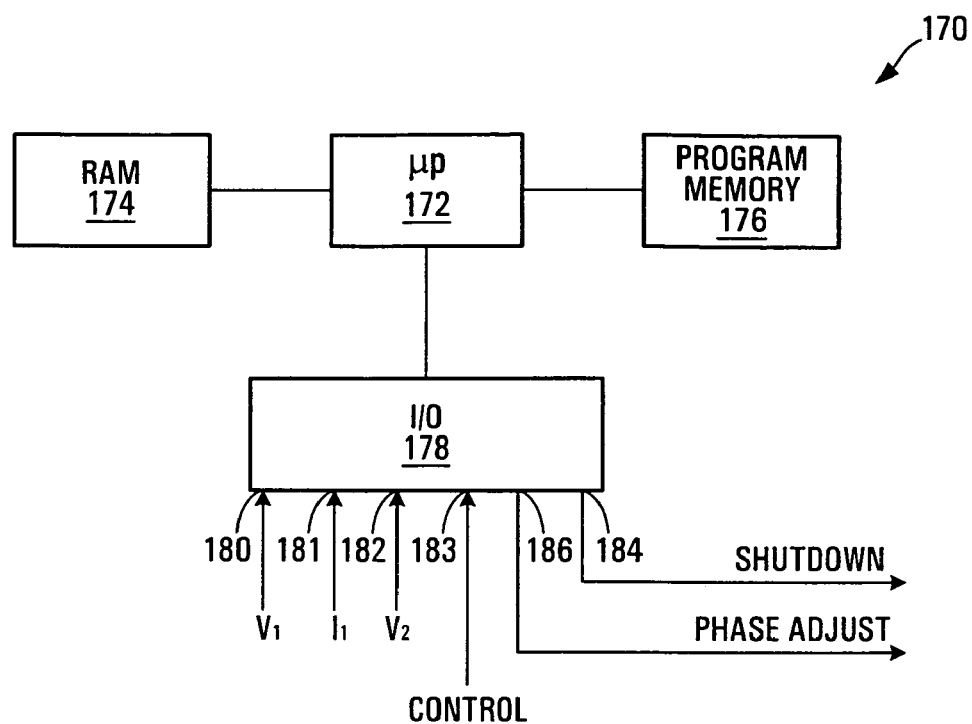
FIG. 6 is a block diagram of a microprocessor circuit for implementing the protection apparatus shown in FIG. 5.

Referring to FIG. 6, a processor circuit for implementing the protection apparatus according to this embodiment is shown generally at 170 and includes a microprocessor 172, RAM 174, program memory 176 and an I/O interface 178. The I/O interface 178 has a first input 180 for receiving the first voltage signal and has a second input 181 for receiving the input current signal and a third input 182 for receiving the second voltage signal. The I/O interface 178 further has a control signal input 183 for receiving the control signal and has a shutdown output 184 for producing the shutdown signal described above and a phase adjust output 186 for producing the phase adjust signal.

Figure 7:
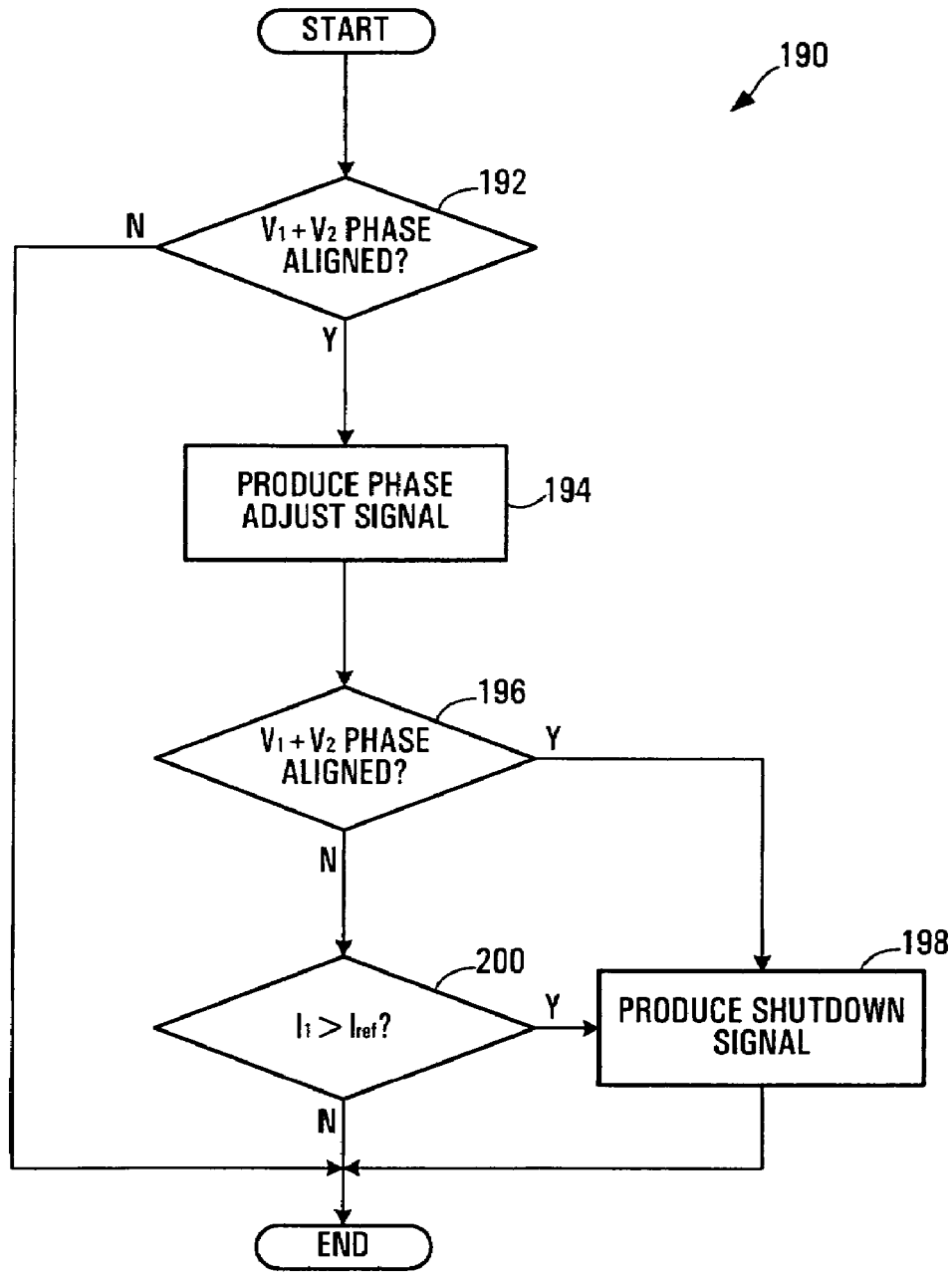
FIG. 7 is a flowchart of codes executed by the processor circuit of FIG. 6 to implement the protection apparatus shown in FIG. 5.

Referring to FIGS. 6 and 7, program codes stored in the program memory 176 are shown generally at 190 and are executed periodically only when the control signal is in the first state indicating the transfer switch is configured to isolate the output terminals from the input terminals. The codes include a first block of codes 192 that direct the microprocessor 172 to cooperate with the I/O interface 178 to determine whether or not the first voltage and the second voltage are phase aligned or in-phase. To do this, the microprocessor may be programmed to sample the first voltage signal and sample the second voltage signal to acquire enough samples to represent a full cycle of the first and second AC voltage waveforms they represent. Then, the processor may be programmed to scan the sample points to produce first and second waveform representations of the first and second voltages, respectively. The processor is then directed to determine the zero crossings of each waveform and a time difference between a zero crossing of the first voltage waveform and a zero crossing of the second voltage waveform. If the zero crossings are within a predefined number of samples of each other, i.e., when the time difference between zero crossings is less than a reference value the waveforms are considered to be aligned and the processor 172 is directed to block 194 which causes it to cooperate with the I/O interface 178 to cause the phase adjust signal to be produced at the output 186. If, on the other hand, the zero crossings of the first input waveform and the second waveform are not phase aligned, then the process is ended as this indicates the inverter/charger (16) is not driving the input terminals (22) and (24) through the relay contacts (38), (40) and (42), (44).

At block 194, the processor is directed to produce the phase adjust signal for receipt by the second power source, i.e., the inverter/charger (16), which is responsive to the phase adjust signal to cause the AC voltage produced across its output terminals (18) and (20) to be advanced or retarded in phase. A suitable advancement or retardation may be approximately 30 degrees, for example. Desirably, the phase shift is caused to occur at the next positive or negative peak in the output AC waveform to minimize disturbance of the waveform.

Block 196 then directs the processor 172 to resample the first voltage and the second voltage to again determine zero crossing points and to determine whether or not the corresponding first and second waveforms are phase aligned.

If the corresponding first and second waveforms are phase aligned as determined at block 196, the processor is directed to block 198 which causes it to cooperate with the I/O interface to produce the shutdown signal, as phase alignment after phase shifting indicates the inverter/charger (16) may be driving the input terminals (22) and (24) through the relay contacts (38), (40) and (42), (44). The process is then ended. If at block 196 the first and second waveforms are not phase aligned, indicating the inverter/charger (16) is not driving the input terminals (22) and (24) through the relay contacts (38), (40) and (42), (44), block 200 directs the processor to read the input current signal at input 181 and then determine whether or not the input current is greater than a reference current. If so, the processor is directed to block 198 to produce the shutdown signal and, if not, the process is ended.

Use of the first and third voltages in the embodiment of FIGS. 9, 10, 11 and 12 provides for the explicit detection of common wiring faults in the first AC source such as a disconnected neutral or ground or a neutral that is not bonded to ground. In the case of a disconnected neutral, with the relay coil 33 not energized, the first voltage exceeds a reference while the third voltage is less than a reference. In the case of a disconnected ground or neutral not bonded to the ground, the first voltage is less than a reference while the third voltage exceeds a reference.

Figure 8:
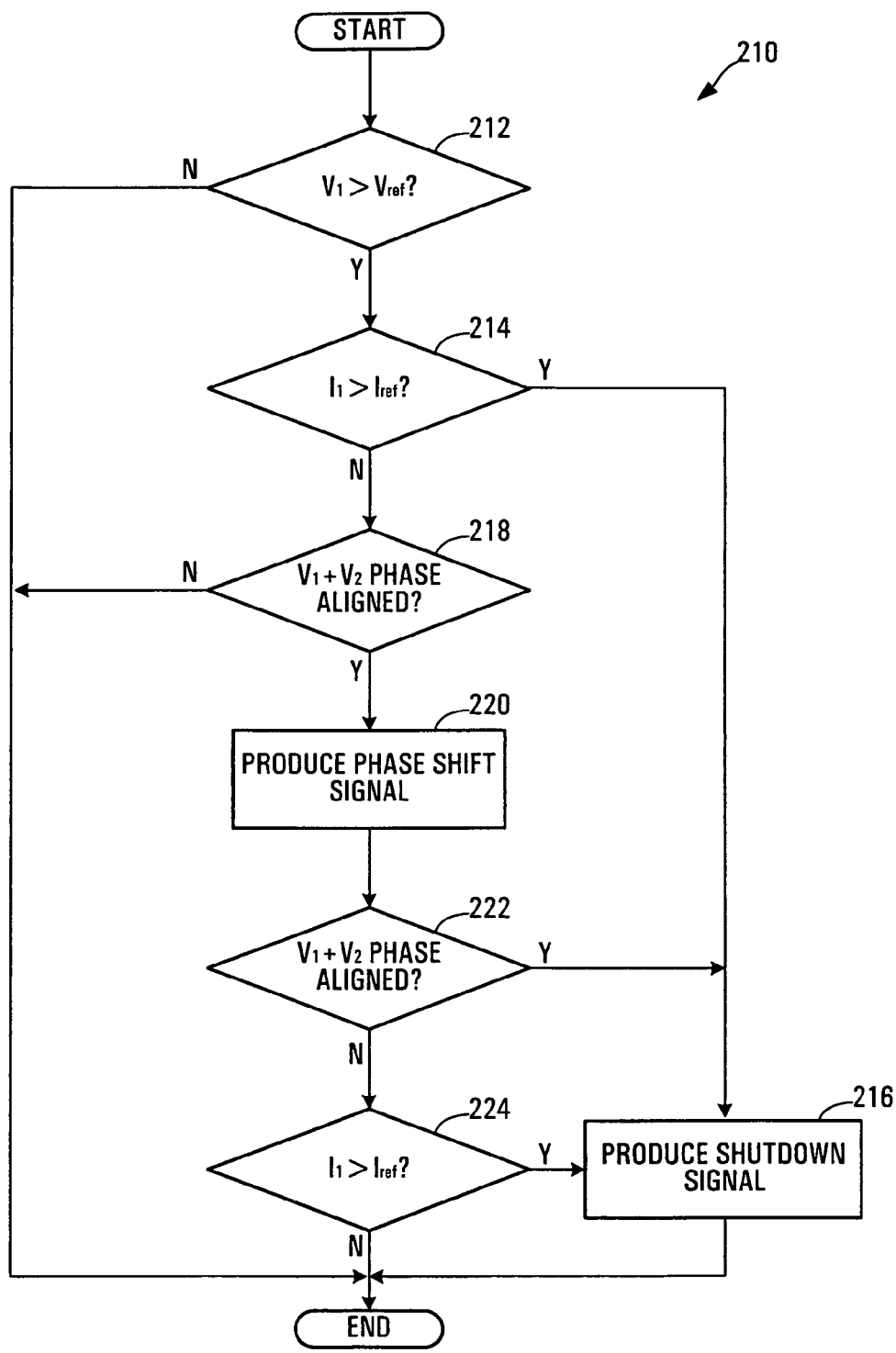
FIG. 8 is a flowchart of codes executed by the processor circuit shown in FIG. 6 to implement an alternative embodiment of the protection apparatus shown in FIG. 5.

Referring to FIG. 8, in an alternate embodiment, the processor circuit shown in FIG. 6 may be used to implement the process shown in FIG. 7 and the process shown in FIG. 4 by storing in the program memory 176 blocks of codes as shown generally at 210 in FIG. 8. The process shown in FIG. 8 is executed periodically while the control signal is in the first state indicating the transfer switch is configured to isolate the output terminals from the input terminals. The blocks of codes include a first block 212 which directs the processor circuit to determine whether the first voltage is greater than the first reference voltage as described in connection with FIG. 4. If the first voltage is not greater than the first reference voltage, the process is ended. If the first voltage is greater than the first reference voltage, the processor is directed to block 214 which directs the processor to determine whether or not the input current is greater than the reference current. If it is greater, the processor is directed to block 216 which causes it to produce the shut down signal and the process is ended.

If at block 214 the input current is not greater than the reference current, block 218 directs the processor to determine whether or not the first and second voltages are phase-aligned. The function of this block is similar to block 192 in FIG. 7 in which zero crossings of first and second voltage waveforms representing the first and second voltages, respectively, are compared for phase alignment.

If the first and second voltage wave forms are not phase aligned the process is ended. If they are phase aligned, the processor is directed to block 220 which causes it to cooperate with the IO interface 178 to produce the phase shift signal for receipt by the inverter/charger (16).

After the phase shift signal has been produced and the inverter/charger 16 shifts the phase of its output voltage, block 222 directs the processor to determine again whether or not the first and second wave forms are phase-aligned. If they are phase-aligned, the processor is directed to block 216 which causes it to produce the shut down signal and the process is ended.

If at block 222 the first and second waveforms are not phase aligned, the processor is directed to block 224 which causes it to determine whether the input current is greater than the reference current and, if so, the processor is directed to block 216 causing it produce the shut down signal and end the process. If at block 224, the input current is not greater than the reference current, the process is ended.

Figure 9:
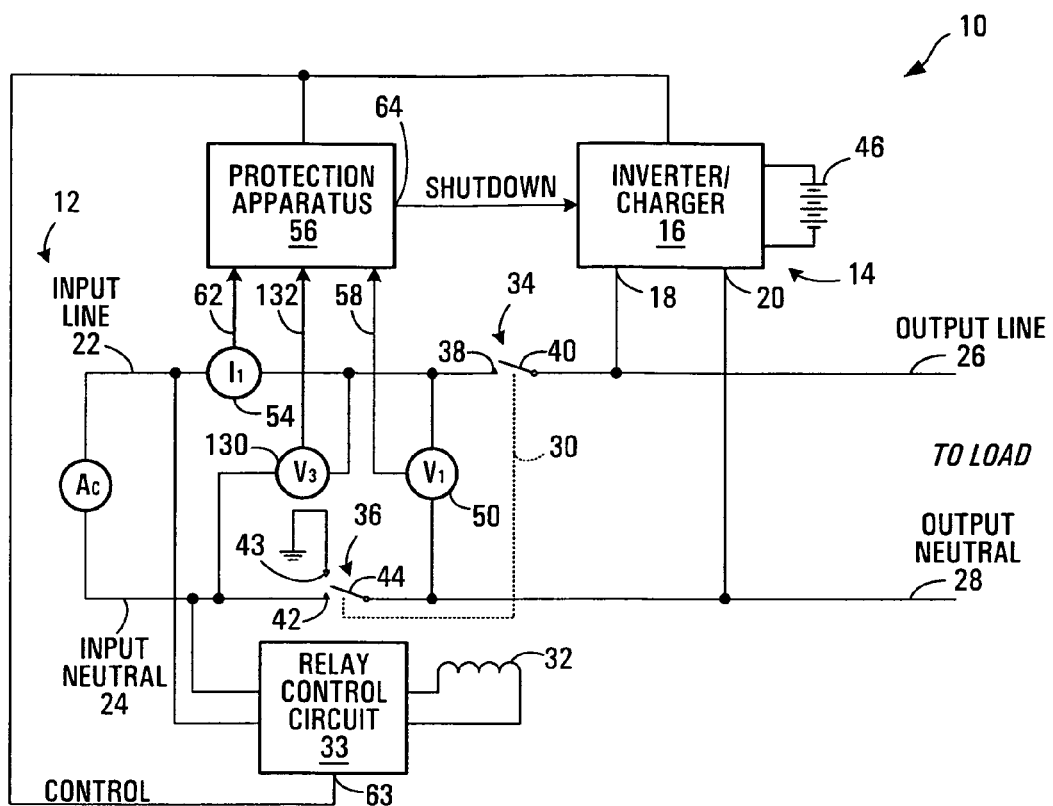
FIG. 9 is a schematic representation of a system including a protection apparatus according to another embodiment of the invention.

Referring to FIG. 9, the system shown in FIG. 1 may be enhanced by the addition of a third voltage sensor 130 for a third voltage, between the input line terminal 22 and the input neutral terminal 24. The third voltage signal which is communicated to the protection apparatus by a signal line 132.

Figure 10:
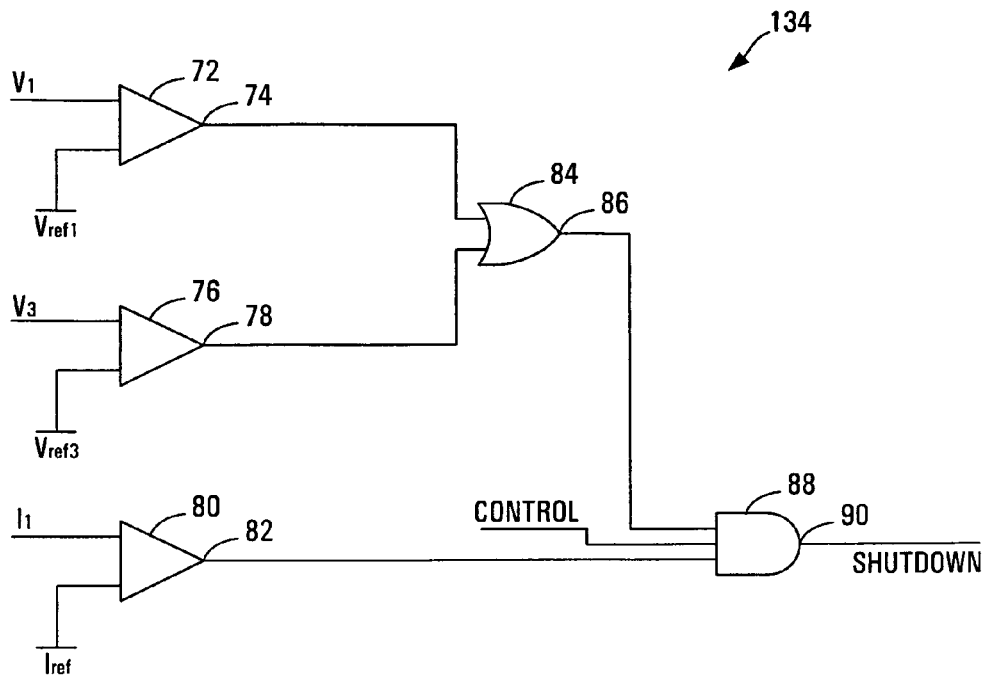
FIG. 10 is a logic diagram of an implementation of the protection apparatus shown in FIG. 9.

Referring to FIG. 10, an exemplary hardware implementation of the protection apparatus (56) is shown generally at 134 and includes the first voltage comparator function 72 and current comparator function 80 and further includes a second voltage comparator function 76 for receiving the third voltage signal and for comparing it to a reference voltage and for producing a signal at an output 78 when the third input voltage is greater than a third reference voltage. The outputs 74 and 78 are connected by signal lines to respective inputs of an OR function 84 which produces a signal at an output 86 thereof when either the first voltage signal indicates the first voltage is greater than the first reference voltage or the third voltage signal indicates the third voltage is greater than the third reference voltage. The signal from the output 82 of the current comparator function 80 and the output 86 of the OR function 84 is then provided as an input to the AND function 88 such that whenever the first voltage is greater than the first reference voltage or the third voltage is greater than the third reference voltage and the input current is greater than the reference current, and the control signal is in the first state indicating the transfer switch is configured to isolate the output terminals from the input terminals, the shutdown signal is produced at the output 90 of the AND function 88.

Figure 11:
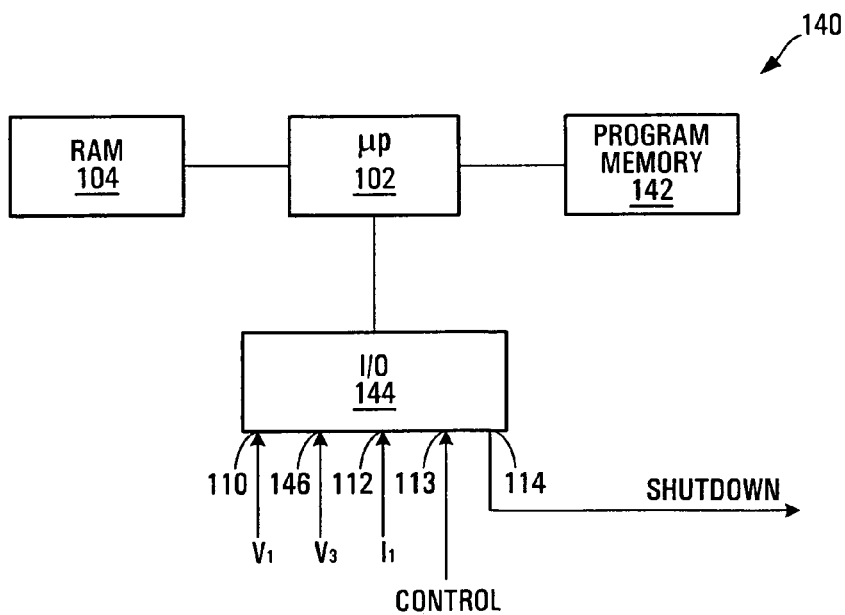
FIG. 11 is a block diagram of a microprocessor circuit for implementing the protection apparatus shown in FIG. 9.

Referring to FIG. 11, a microprocessor implementation of the protection apparatus 56 shown in FIG. 9 is seen at 140 and includes the microprocessor 102 shown in FIG. 3, the RAM 104 shown in FIG. 3, a program memory 142 similar to that shown in FIG. 3 but with enhanced program codes, and an I/O interface 144 similar to that shown in FIG. 3 with the addition of a further input 146 for receiving the third voltage signal. The I/O interface 144 still has inputs 110, 112 and 113 for receiving the first voltage signal, the first input current signal, and the control signal and still has an output 114 for producing the shutdown signal.

Figure 12:
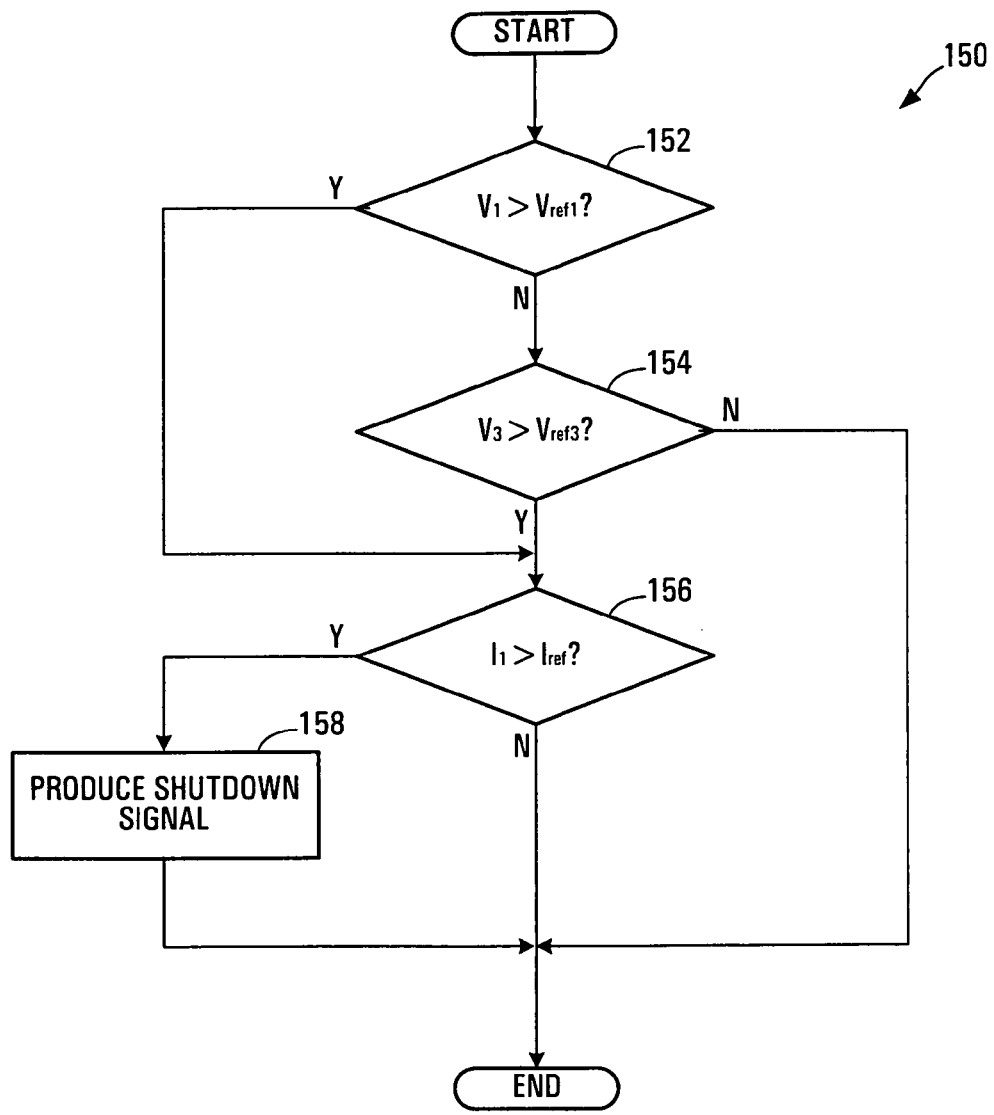
FIG. 12 is a flowchart of codes executed by the processor circuit of FIG. 11 to implement the protection apparatus shown in FIG. 9.

Referring to FIG. 12, a flowchart representing blocks of codes encoded in the program memory 142 shown in FIG. 11 is shown generally at 150 and represents a process that is executed periodically while the control signal is in the first state indicating the transfer switch is configured to isolate the output terminals from the input terminals. The blocks include a first block of codes 152 that functions similar to that shown at 122 in FIG. 4, but with the exception that when the first voltage is not greater than the first reference voltage, the processor (102) is directed to block 154 which directs the processor (102) to determine whether or not the third voltage is greater than the third reference voltage. The third voltage signal may be converted into an RMS value as described in connection with the first voltage signal and the third reference voltage may be stored in the program memory 142. If, at block 154 the third voltage is greater than the third reference voltage, the processor is directed to block 156 which directs the processor (102) to determine whether or not the input current is greater than the reference current value and, if so, directs the processor to block 158 causing it to produce the shutdown signal. If the input current is not greater than the reference current, the process is ended. Thus, if either the first voltage is greater than the first reference voltage or the third voltage is greater than the third reference voltage, the processor is directed to block 156. If, at block 154, the third voltage is not greater than the third reference voltage, the processor is directed to end the process.

Figure 13:
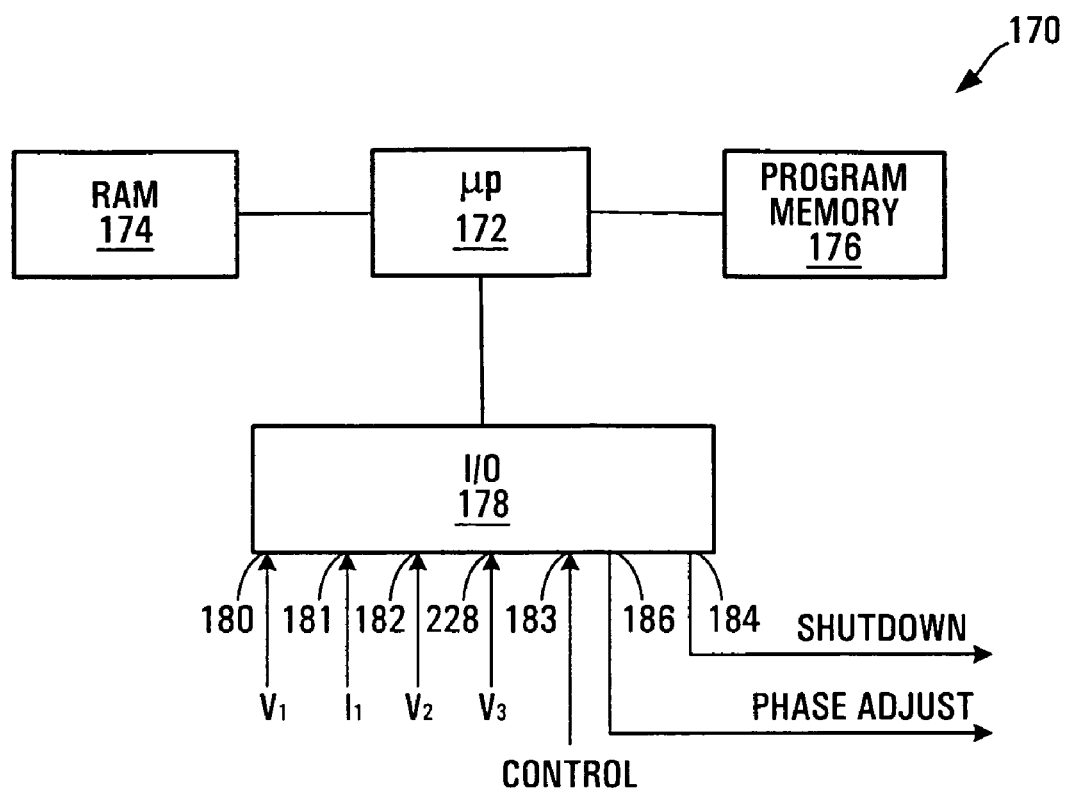
FIG. 13 is a block diagram of a microprocessor circuit for implementing an alternate protection apparatus in the system shown in FIG. 9.

Referring to FIG. 13, the first voltage aspect, the phase shift aspect and the third voltage aspect may all be used in a single process to determine whether or not to actuate the shutdown signal. In this regard, a processor circuit shown in FIG. 13 is similar to that shown in FIG. 6 with the exception that it includes another input 228 for receiving the third voltage signal and the program memory 176 is encoded with an enhanced set of program codes as shown in FIG. 14, which is executed periodically while the control signal is in the first state indicating the transfer switch is configured to isolate the output terminals from the input terminals.

Figure 14:
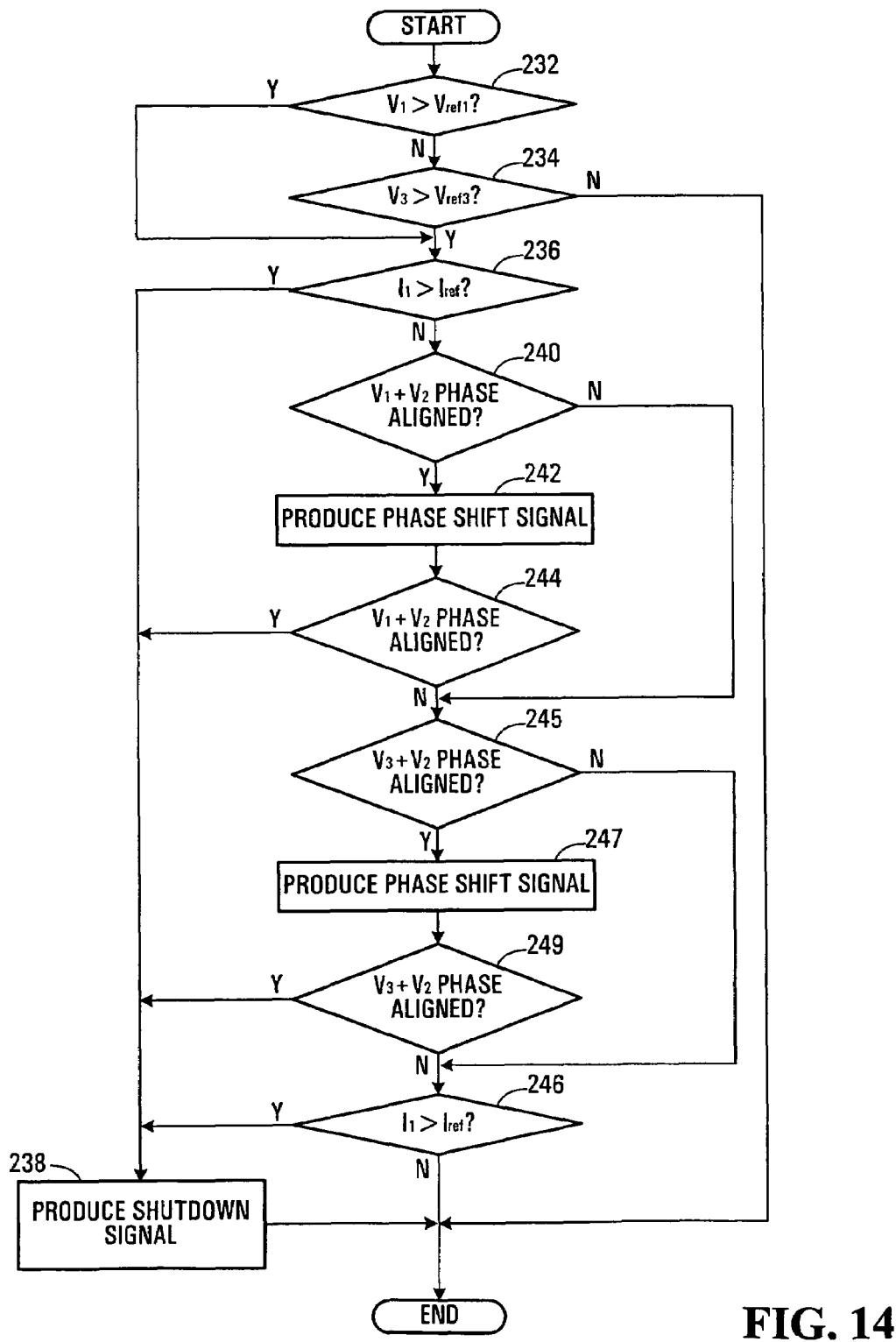
FIG. 14 is a flowchart of codes executed by the processor circuit of FIG. 13 to implement the alternate implementation of the protection apparatus shown in FIG. 9.

Referring to FIG. 14, a first block of codes 232 directs the processor circuit to cooperate with the I/O interface (178) to determine whether or not the first voltage is greater than the first reference voltage. If at block 232, the first input voltage is greater than the reference voltage, the processor is directed to block 236. If not, the processor is directed to block 234 it to determine whether or not the third voltage is greater than the third reference voltage. If at block 234, the third voltage is not greater than the third reference voltage, the process is ended. If at block 234, the third voltage is greater than the third reference voltage, block 236 directs the processor circuit to determine whether or not the input current is greater than the reference current.

If at block 236, the input current is greater than the reference current value, the processor is directed to block 238 which causes it to produce the shutdown signal and the process is ended. If at block 236 however, the input current is not greater than the reference current value the processor is directed to block 240 which causes it to determine whether or not the first and second voltages are phase-aligned, following the procedure described in connection with block 192 of FIG. 7.

If the first and second voltages are phase aligned, the processor is directed to block 242 which directs it to cause the phase shift signal to be produced at the output (186) to cause the second AC source to phase shift its output voltage by some amount, such as 30 degrees, for example. The processor is then directed to block 244 which directs it to again determine whether the first and second voltages are phase aligned. If at block 244, the first and second input voltages are phase aligned, the processor is directed to block 238 which directs it to produce the shutdown signal.

If at block 240, or at block 244, the first and second input voltages are not phase aligned, the processor is directed to block 245 which directs it to determine whether the second and third voltages are phase aligned. If at block 245, the second and third voltages are phase aligned, the processor is directed to block 247 which directs it to produce the phase shift signal at the I/O interface 178 to cause the second AC source to phase shift its output voltage by some amount such as 30 degrees. Block 249 then directs the processor circuit to determine whether the second and third voltages are phase aligned -and if so, the processor is directed to block 238 which directs it to cause the shutdown signal to be produced.

If at block 245, or at block 249, the second and third voltages are not phase aligned, the processor is directed to block 246 which directs it to determine whether the input current is greater than the reference current value. If so, the processor is directed to block 238 which directs it to cause the shutdown signal to be produced. If not, the process is ended.

While specific embodiments of the invention have been described and illustrated, such embodiments should be considered illustrative of the invention only and not as limiting the invention as construed in accordance with the accompanying claims.

What is claimed is:

1. In a system for selectively supplying AC power to a load from first or second AC sources, the system having input terminals comprising line and neutral terminals for receiving AC power from the first AC source and having output terminals comprising output line and neutral terminals for receiving AC power from the second source and for supplying AC power to the load, wherein the input terminals and the output terminals are selectively connectable by a transfer switch configurable to connect the input terminals to the output terminals or to isolate the input terminals from the output terminals, a process for detecting an unsafe condition comprising:
    receiving a first voltage signal representing a first voltage on the input line terminal relative to the output neutral terminal;
    receiving a second voltage signal representing an output voltage produced by the second AC source and supplied to the output terminals of the system;
    receiving an input current signal representing input current in the input line terminal; and
    when the transfer switch is configured to isolate the output terminals from the input terminals, causing the second AC source to phase shift said second voltage when said first and second voltages are in-phase; and
    after phase shifting said second voltage, causing the second AC source to cease supplying power to the output terminals when said first and second voltages are still in phase.

2. The process of claim 1 wherein causing the second AC power source to phase shift said second voltage comprises producing a phase shift signal for receipt by the second AC source for causing the second AC source to phase shift said second voltage.

3. The process of claim 1 wherein causing the second AC power source to cease supplying power to the output terminals comprises producing a shutdown signal for receipt by the second AC source.

4. The process of claim 1 further comprising causing the second AC source to cease supplying power to the output terminals, when, after phase shifting said second voltage, said first and second voltages are not in phase and said input current exceeds a reference current.

5. The process of claim 4 wherein causing the second AC source to cease supplying power to the output terminals comprises producing a shutdown signal for receipt by the second AC source.

6. The process of claim 1 further comprising determining whether said first and second voltages are in-phase.

7. The process of claim 6 wherein determining whether said first and second voltages are in-phase comprises detecting a time difference between a zero-voltage crossing of said first voltage and a zero-voltage crossing of said second voltage.

8. The process of claim 7 wherein determining whether said first and second voltages are in-phase comprises producing a signal when said time difference is less than a reference value.

9. The process of claim 1 further comprising determining whether the transfer switch is configured to isolate the output terminals from the input terminals.

10. The process of claim 1 further comprising causing the second AC source to cease supplying power to the output terminals when said first voltage and said input current satisfy a first set of criteria.

11. The process of claim 10 wherein causing the second AC source to cease supplying power to the output terminals comprises producing a shutdown signal for receipt by the second AC source.

12. The process of claim 10 wherein said first set of criteria includes:
    said first voltage has an amplitude that exceeds a first reference voltage; and
    said input current has a value that exceeds a reference current.

13. The process of claim 10 further comprising:
    receiving a third voltage signal representing a third voltage between the input line terminal and the input neutral terminal; and
    causing the second AC power source to cease supplying power to the output terminals when said third voltage exceeds a third reference voltage and said input current exceeds a reference current.

14. The process of claim 13 wherein causing the second AC source to cease supplying power to the output terminals comprises producing a shutdown signal for receipt by the second AC source.

15. A computer readable medium encoded with codes for directing a processor circuit to carry out the method of claim 1.

16. A computer readable signal encoded with codes for directing a processor circuit to carry out the method of claim 1.

17. An apparatus for detecting an unsafe condition in a system for selectively supplying AC power to a load from first or second AC sources, the system having input terminals comprising line and neutral terminals for receiving AC power from the first AC source and having output terminals comprising output line and neutral terminals for receiving AC power from output terminals of the second source and for supplying AC power to the load, and a transfer switch being operable to selectively connect the input terminals to the output terminals or to isolate the input terminals from said output terminals, the apparatus comprising:

means for receiving a first voltage signal representing a first voltage on the input line terminal relative to the output neutral terminal;

means for receiving a second voltage signal representing second voltage produced by the second AC source;

means for receiving a current signal representing an input current in the input line terminal; and means for producing a phase shift signal for receipt by the second AC source for causing the second AC source to phase shift said second voltage when said first and second voltages are in-phase and when the transfer switch is configured to isolate the output terminals from the input terminals; and means for producing a shutdown signal when said first and second voltages are still in phase, after producing said phase shift signal.

18. The apparatus of claim 17 further comprising means for determining whether said first and second voltages are in-phase.

19. The apparatus of claim 18 further comprising means for detecting a time difference between a zero-voltage crossing of said first voltage and a zero-voltage crossing of said second voltage.

20. The apparatus of claim 19 further comprising means for producing a signal when said time difference is less than a reference value.

21. The apparatus of claim 17 further comprising means for producing said shutdown signal when, after producing said phase shift signal, said first and second voltages are not in phase and said input current exceeds a reference current.

22. The apparatus of claim 17 further comprising means for producing said shutdown signal for causing the second AC power source to cease supplying power to the output terminals when said first voltage signal and said input current signal indicate said first voltage and said input current satisfy a first set of criteria.

23. The apparatus of claim 17 further comprising means for producing said transfer switch signal indicating the transfer switch is configured to isolate the output terminals from the input terminals.

24. The apparatus of claim 17 further comprising means for receiving a transfer switch signal when the transfer switch is configured to isolate the output terminals from the input terminals.

25. The apparatus of claim 17 wherein said first set of criteria includes:

said first voltage signal indicates said first voltage has an amplitude that exceeds a first reference voltage; and said input current signal indicates said input current has a value that exceeds a reference current.

26. The apparatus of claim 17 further comprising:

means for receiving a third voltage signal representing a third voltage between the input line terminal and the input neutral terminal; and means for producing said shutdown signal when said third voltage signal indicates said third voltage exceeds a third reference voltage.

27. An apparatus for detecting an unsafe condition in a transfer switch in a system for selectively supplying AC power to a load from first or second AC sources, the system having input terminals comprising line and neutral terminals for receiving AC power from the first AC source and having output terminals comprising output line and neutral terminals for receiving AC power from output terminals of the second source and for supplying AC power to the load, the transfer switch being operable to selectively connect the input terminals to the output terminals or to isolate the input terminals from the output terminals, the apparatus comprising:

a processor;

a first voltage input coupled to said processor for receiving a first voltage signal representing a first voltage on the input line terminal relative to the output neutral terminal;

a second voltage input coupled to said processor for receiving a second voltage signal representing an second voltage produced by the second AC source supplying power;

a current input coupled to said processor for receiving a current signal representing an input current in the input line terminal;

a shutdown signal output coupled to said processor for producing a shutdown signal for causing the second AC source to cease supplying power to the output terminals when the transfer switch is configured to isolate the output terminals from the input terminals;

a phase shift signal output coupled to said processor for producing a phase shift signal for receipt by the second AC source for causing the second AC source to phase shift said second voltage;

said processor being configured to cause said phase shift signal to be produced at said phase shift signal output when said first and second voltages are in-phase; and said processor being configured to cause a shutdown signal to be produced when said first and second voltages are still in phase after producing said phase shift signal.

28. The apparatus of claim 25 further comprising a detector operably configured to detect whether said first and second voltages are in-phase.

29. The apparatus of claim 28 wherein said detector comprises a zero-crossing detector operably configured to detect a time difference between a zero-voltage crossing of said first voltage and a zero-voltage crossing of said second voltage.

30. The apparatus of claim 29 wherein said detector includes a phase monitor signal generator operably configured to generate said phase monitor signal when said time difference is less than a reference value.

31. The apparatus of claim 30 further including a phase monitor signal input coupled to said processor for receiving said phase monitor signal.

32. The apparatus of claim 26 further comprising means for determining whether said first and second input voltages are in-phase.

33. The apparatus of claim 30 further comprising means for detecting a time difference between a zero-voltage crossing of said first voltage and a zero-voltage crossing of said second voltage.

34. The apparatus of claim 31 further comprising means for producing a signal when said time difference is less than a reference value.

35. The apparatus of claim 27 wherein said processor is configured to cause said shutdown signal to be produced when, after producing said phase shift signal, said first and second voltages are not in phase and said input current exceeds a reference current.

36. The apparatus of claim 27 wherein said processor is configured to cause said shutdown signal output to produce said shutdown signal when said first voltage signal and said input current signal indicate said voltage and said input current satisfy a first set of criteria.

37. The apparatus of claim 27 further comprising a transfer switch signal input coupled to said processor for receiving a transfer switch signal when the transfer switch is configured to isolate the output terminals from the input terminals.

38. The apparatus of claim 36 wherein said processor is configured to determine said first set of amplitude criteria are met when:

said first voltage signal indicates said first voltage has an amplitude that exceeds a first reference voltage; and said input current signal indicates said input current has a value that exceeds a reference current.

39. The apparatus of claim 36 further comprising:

a third voltage input coupled to said processor for receiving a third voltage signal representing a third voltage between the input line terminal and the input neutral terminal; and wherein said processor is configured to produce said shutdown signal when said third voltage signal indicates said third voltage exceeds a third reference voltage and said input current exceeds a reference current.

* * * * *